| (12) | United States Patent | (10) Patent No.: | US 8,189,105 B2 |
|---|---|---|---|
| | Jiang et al. | (45) Date of Patent: | May 29, 2012 |

(54) SYSTEMS AND METHODS OF MOTION AND EDGE ADAPTIVE PROCESSING INCLUDING MOTION COMPENSATION FEATURES

(75) Inventors: Jiande Jiang, San Jose, CA (US); Jun Zhang, San Jose, CA (US); Yong Wu, Santa Clara, CA (US); Dong Wang, Shanghai (CN); Chun Wang, Shanhai (CN)

(73) Assignee: Entropic Communications, Inc., San Diego, CA (US)

( * ) Notice: Subject to any disclaimer, the term of this patent is extended or adjusted under 35 U.S.C. 154(b) by 1258 days.

(21) Appl. No.: 11/874,096

(22) Filed: Oct. 17, 2007

(65) Prior Publication Data

US 2009/0102966 A1    Apr. 23, 2009

(51) Int. Cl.
    *H04N 7/01*    (2006.01)
(52) U.S. Cl. ......................................... 348/452; 345/448
(58) Field of Classification Search .................. 348/448, 348/452, E7.003
See application file for complete search history.

(56) References Cited

U.S. PATENT DOCUMENTS

| 6,285,804 | B1 * | 9/2001 | Crinon et al. ................. 382/299 |
| 7,375,760 | B2 * | 5/2008 | Kempf et al. ................. 348/441 |
| 2004/0114833 | A1 | 6/2004 | Jiang |
| 2005/0129306 | A1 | 6/2005 | Wang et al. |
| 2006/0018562 | A1 | 1/2006 | Ruggiero |
| 2006/0039590 | A1 * | 2/2006 | Lachine et al. ............... 382/128 |

OTHER PUBLICATIONS

International Search Report and Written Opinion, received in corresponding PCT application No. PCT/US2008/080372.

* cited by examiner

*Primary Examiner* — Kieu Oanh T Bui

(57) ABSTRACT

Systems and methods of processing pixel information associated with video image deinterlacing are disclosed. In one exemplary implementation, the method may include performing an edge adaptive interpolation process on a present field so as to determine whether an edge passes through a pixel, wherein the edge adaptive interpolation process provides edge data including a first intensity estimate for the pixel, receiving motion data associated with motion compensation processing, including an estimated motion vector for at least one pixel proximate to the pixel in at least one reference field, determining a second intensity estimate for the pixel as a function of the edge data and the motion data, and performing an intensity-calculation procedure, wherein an interpolated intensity of the pixel is calculated as a function of the first intensity estimate and the second intensity estimate.

28 Claims, 11 Drawing Sheets

SYSTEMS AND METHODS OF MOTION AND EDGE ADAPTIVE PROCESSING INCLUDING MOTION COMPENSATION FEATURES

BACKGROUND

1. Field

The present invention relates generally to video image display and, more specifically, to video image processing such as deinterlacing.

2. Description of Related Information

Many television and video signals are interlaced, where the set of scan lines (typically 525 for NTSC color television) which make up a single video frame are not scanned or transmitted sequentially. Rather, the video frame is divided into two "fields", each field comprising every other scan line. In television, the scan lines comprising one field are transmitted first, followed by the scan lines of the second field.

However, a number of display devices, such as computer monitors, are not interlaced. Rather, these devices sequentially scan the entire display area, one scan line after another. To display an interlaced scanned sequence, such as a video signal, on such progressively scanned devices, a deinterlacing process must convert each separate field into a complete display frame that can be sequentially output to the display device. The main task of a deinterlacing process is to reconstruct the missing line between each of the scan lines of an interlaced field.

There are two primary deinterlacing methods, each with their own strengths and weaknesses. "Inter-field" techniques simply merge the data from the second field with the data from the first field to produce a completed frame. If there is no motion in the video frame, such methods yield an ideal reconstituted picture. Vertical resolution can be as good as an original noninterlaced frame. However, if there is motion within the video signal, motion effects will generally be visible to the human eye. Motion effects arise when an object, which was in one location during the scanning of the first field, has moved when the alternating scan lines of the second field are scanned. Simply combining the interlaced scan lines of the two fields yields an unacceptable rendition of the object.

"Intra-field" techniques use data only from a single field to produce a complete frame. Such methods are better suited for video frames having motion. With an intra-field technique, the values for non-existent pixels are interpolated from pixel values in the scan lines above and below the non-existent pixels. While this technique produces no deleterious motion effect, since it does not incorporate motion from one field to the next, it also does not enhance vertical resolution, since it merely interpolates from existing pixel values within a single field and does not use pixel information for missing scan lines from the second field. Also, simple intra-field deinterlacing techniques (such as simple vertical interpolation) tend to generate unacceptable jagged pictures along diagonal edges.

Further, such processing and deinterlacing methodologies suffer problems outputting a satisfactory video image when the video information being processed includes images/pixel data that is in motion, particularly as the extent of motion for particular pixels becomes large. Accordingly, there is a need to increase image processing reliability, provide motion compensation processing, and reduce defects such as blur in output video images.

SUMMARY

Systems and methods consistent with the present invention are directed to video image processing such as deinterlacing.

In one exemplary embodiment, there is provided a method of processing pixel information associated with video image deinterlacing. Moreover, the method includes performing an edge adaptive interpolation process on a present field that determines whether an edge passes through the pixel and provides a first intensity estimate for the pixel; receiving motion data from a motion compensation process, including an estimated motion vector for at least one pixel proximate to the pixel in at least one reference field; and determining a second intensity estimate for the pixel as a function of edge data from the edge adaptive interpolation process and the motion data. One or more further embodiments may include performing intensity-calculation procedures, for example, interpolating an intensity of the pixel as a function of the first intensity estimate and the second intensity estimate.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DRAWINGS

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Many techniques are used to process and/or deinterlace video data from a source. Examples of such techniques are those that employ motion detection, edge detection or filtering processes, as well as those that may include blending functionality to prevent switching artifacts.

In general, aspects of the innovations herein relate to interpolating a pixel during the deinterlacing of a video signal, e.g., a video signal that includes at least two fields of interlaced scan lines, each scan line including a series of pixels having respective intensity values. Exemplary processing associated with such pixel information includes generating a motion value representative of the motion between successive frames about the pixel, detecting an edge direction about the pixel, performing an edge adaptive interpolation at the pixel, using the detected edge direction, receiving and incorporating motion compensation data, and performing a motion adaptive interpolation at the pixel, using the generated motion value.

Figure 1:
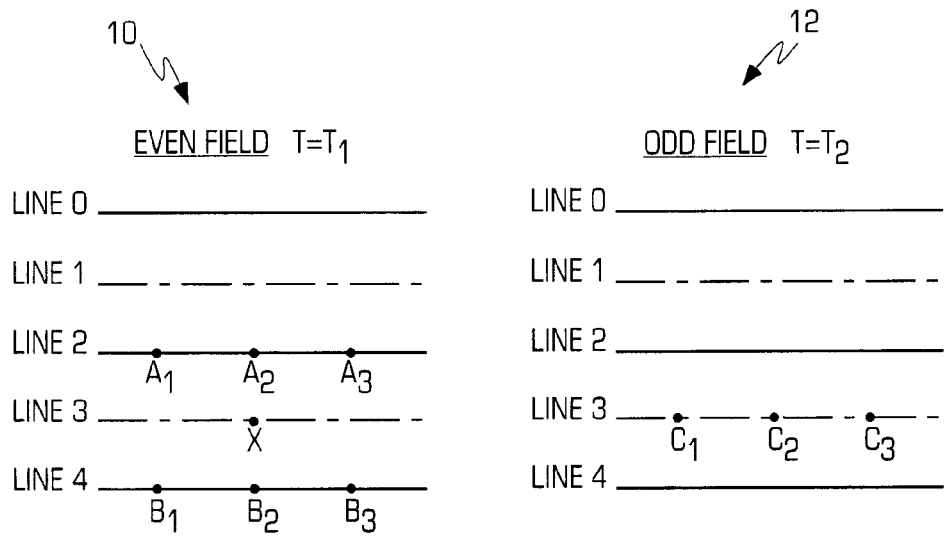
FIG. 1 is a diagram illustrating exemplary even and odd fields in an interlaced scanned video source consistent with aspects related to the innovations herein.

FIG. 1 shows diagrams of an even field 10 and an odd field 12 of a typical interlaced scanned video source. Even field 10 consists of even scanning lines 0, 2, and 4, etc., while odd field 12 consists of odd scanning lines 1, 3, etc. A typical NTSC television video source consists of 525 lines divided in this manner. Even field 10 is scanned at time $t=t_1$ while odd field 12 is scanned at later time $t=t_2$. To construct a complete frame from, e.g., the even field 10, each missing line (e.g., line 3) must be reconstructed. Solid lines in FIG. 1 represent existing scanned lines in a given field, while dashed lines depict missing lines that require reconstruction.

As an example, each pixel element X along line 3 of even field 10 must be reconstructed. One can simply use pixel elements $C_1$, $C_2$, and $C_3$, etc. from the next odd field 12, but such a simple inter-field technique can introduce motion effects as described. Or one can simply interpolate the missing elements $C_1$, $C_2$, and $C_3$ using the intra-field neighboring pixel values $A_1, A_2, A_3$ and $B_1, B_2, B_3$, etc. But such intra-field techniques do not provide high vertical resolution and can produce jagged aliasing artifacts along diagonal edges.

With regard to pixel processing, aspects of the innovations herein may relate to one or more of the following features. A motion value can be generated by comparing segments of pixels about the pixel from successive frames. The segments can include at least two consecutive pixels in a scan line. Generating the motion value can include, for each of a plurality of pixel segments from successive frames about the pixel, calculating a plurality of differences, determining the greatest of the calculated plurality of differences, and determining the motion value from a look-up table using the greatest of the calculated plurality of differences. Whether an edge exists about the pixel can be determined and the look-up table selected from a plurality of look-up tables depending upon whether an edge exists. Further, the motion value can be generated by comparing segments of pixels about the pixel from at least three successive frames, and the pixel segments for at least one of the successive frames can be stored in a feature buffer.

Figure 2:
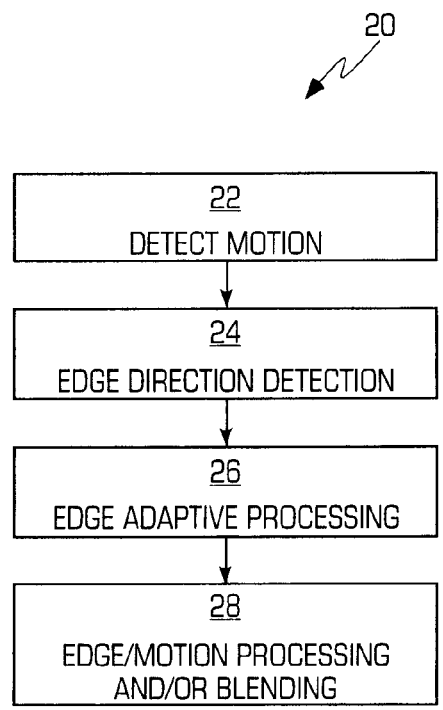
FIG. 2 is a flow chart illustrating an exemplary motion and edge processing method consistent with aspects related to the innovations herein.

FIG. 2 shows a flow chart of an exemplary deinterlacing method 20 that improves vertical resolution for areas of a frame that have less motion and reduces unwanted motion effects in other areas that have greater motion. In a first exemplary step 22, for each pixel X, a motion value is detected using the information from a succession of frames. Such motion value may, for example, be a 4-bit integer having a value ranging from 0 through 15 and proportional to the motion level of the scene around pixel X. In a second exemplary step 24, an edge direction may be detected for pixel X using the intensity values of neighboring pixels around pixel X within its own frame. For example, the edge direction can be defined as generally 45 degrees, 135 degrees, or no edge (also 90 degrees). In a third exemplary step 26, an intermediate interpolated value for the pixel is determined by using the edge direction data and certain neighboring pixel values around pixel X. And finally, in a fourth exemplary step 28, a final pixel value for pixel X may be obtained via combination of the intermediate interpolated value and the value for pixel X from the next field, with one or both of these values being optionally weighted by the detected motion value, motion compensation information, and/or other motion-related data, as set forth herein.

Figure 3:
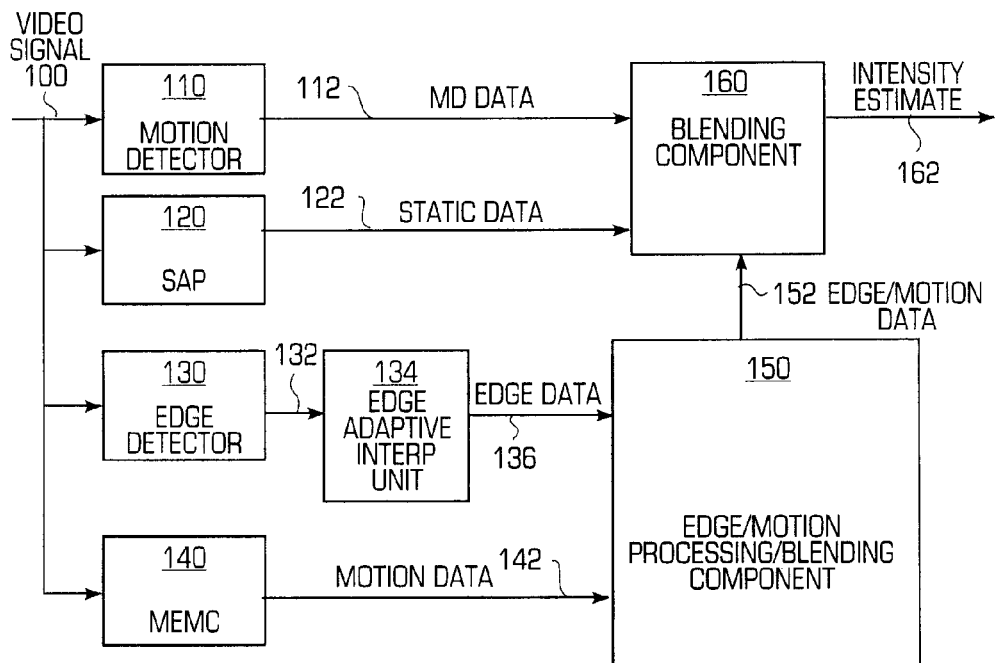
FIG. 3 is a block diagram illustrating an exemplary deinterlacing system consistent with aspects related to the innovations herein.

In FIG. 3, a block diagram illustrating an exemplary deinterlacing system consistent with aspects of the present invention is provided. Although a more detailed discussion of each component in FIG. 3 is described later, a brief overview of how these components may be inter-connected is provided here. Within such exemplary embodiment, interlaced video signal 100 is input to motion detector 110, static area processing unit 120, edge detector 130, and motion estimator/compensator unit 140, as shown. Upon receiving video signal 100, motion detector 110 and static area processing unit 120 output motion detection data 112 and static data 122, respectively, wherein each of output motion detection data 112 and static data 122 are input to blending component 160. Motion detection data 112 may be a multi-bit number to indicate the motion level. In a basic exemplary implementation, motion detection data may be a 4-bit number, with b0000 equating to no motion, and b1111 equating to maximum motion.

With regard to edge detection, edge detector 130 receives video signal 100 and outputs edge detection data 132, which is input to edge adaptive interpolation unit 134 so as to produce edge data 136. Video signal 100 is then also received by motion estimator/compensator unit 140 so as to produce motion data 142. Then, edge data 136 and motion data 142 are input to edge/motion processing/blending component 150 so as to produce edge/motion data 152, which may be sent to a post processing component, such as blending component 160. Blending component 160 may be consistent with the blending, edge detection, and edge adaptive interpolation components set forth in U.S. Pat. No. 7,242,819, which is incorporated herein by reference, as such components are applied to the presently-described system. Here, by way of example, the blending component 160 output may be the sum of two products, the first being some product of the edge/motion data 152 and the motion data 112, and the second being some product of the static data 122 and a function of the motion data 112. Thus, an exemplary output might be given by the following result:

(edge/motion data)*motion+(static data)*(Max−motion)/Max

Where Max may be the associated Maximum (e.g., 16 when motion=4-bits)

Upon receiving each of motion detection data 112, static data 122, and edge/motion data 152, blending component 160 outputs an intensity estimate 162 for pixel X (e.g., an estimate for the luminance or chrominance of pixel X). By smoothly combining both intra-field and inter-field values for each pixel in a frame, weighted by motion detection data 112 detected at the pixel, the present method provides for greater accuracy in deinterlacing scanned video signals and greater fidelity in the displayed image, for both static and dynamic portions of scene. Namely, the intra-field interpolation result (i.e., edge/motion data 152) is proportionally mixed with the value $C_2$ for pixel X obtained from the next field (i.e., static data 122) according to the amount of motion detected at pixel X (i.e., motion detection data 112). For example, if motion detection data 112 is high, the intensity estimate 162 of pixel X may be determined mostly by the intra-field result represented by edge/motion data 152. On the other hand, if motion detection data 112 is very low, intensity estimate 162 may be determined mostly from its value C in the next field represented by static data 122.

Turning back to the edge-related processing (e.g., edge detection 130, edge-adaptive interpolation 134, etc.), an edge direction can be detected by forming the respective differences for a first plurality of pixel pairs. For example, each such pixel pair may be comprised of two pixels from scan lines respectively above and below the pixel, with each pixel pair for the first plurality of pixel pairs having a first common direction. As such, exemplary edge direction processing may include calculating a first combined difference for the first plurality of pixel pairs from the respective differences for the first plurality of pixel pairs, forming the respective differences for a second plurality of pixel pairs (each pixel pair comprising two pixels from scan lines respectively above and below the pixel, with each pixel pair for the second plurality of pixel pairs having a second common direction), calculating a second combined difference for the second plurality of pixel pairs from the respective differences for the second plurality of pixel pairs, and comparing the difference between the second combined difference and the first combined difference with an edge threshold to determine whether an edge exists.

Each plurality of pixel pairs may also include at least three pixel pairs. Moreover, calculating the first and second combined differences can include adding the absolute values of each of the respective differences formed from each of the respective pixel pairs for the first and second plurality of pixel pairs, respectively. Further, the first direction can be along an approximate 135 degree angle from vertical at the pixel and the second direction can be along an approximate 45 degree angle from vertical at the pixel.

Exemplary edge direction processing may also include forming the respective differences for a third plurality of pixel pairs, each pixel pair comprising two pixels from scan lines respectively above and below the pixel, each pixel pair for the third plurality of pixel pairs having a third common direction, calculating a third combined difference for the third plurality of pixel pairs from the respective differences for the third plurality of pixel pairs, and if an edge exists, comparing the third combined difference with the first and second combined differences to determine the edge direction. Each of the third plurality of pixel pairs can include at least three pixel pairs, and calculating the third combined difference can include adding the absolute values of each of the respective differences formed from each of the respective pixel pairs for the third plurality of pixel pairs. Additionally, calculating the third combined difference can further include multiplying the added absolute values with a sensitivity factor. According to one or more aspects consistent with the innovations herein, the third direction can be substantially vertical.

Additional edge detection 130 and edge adaptive interpolation 134 features and functionality may also be consistent with that disclosed in U.S. Pat. No. 7,242,819, which Is incorporated herein by reference.

Figure 4A:
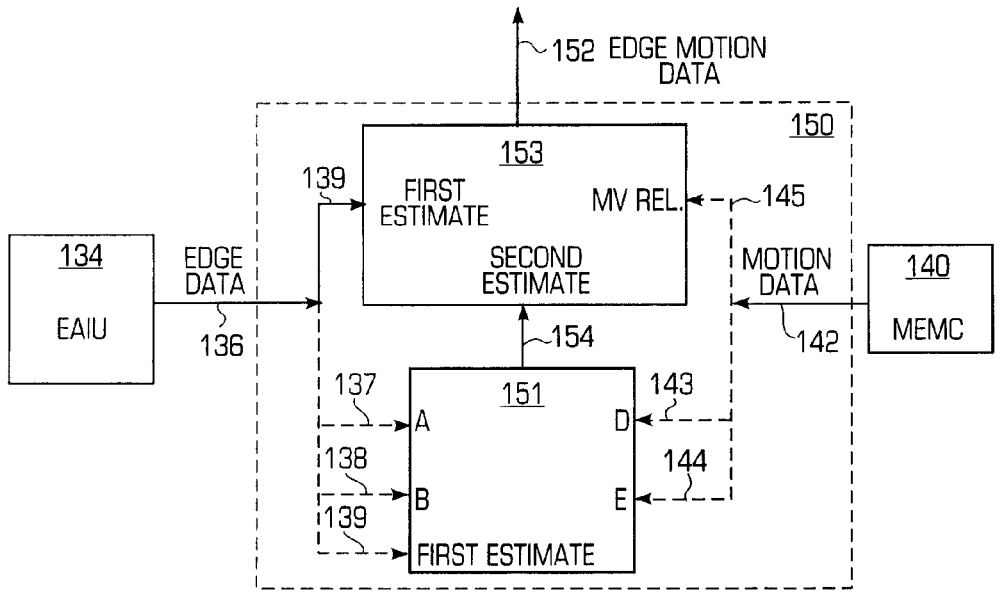
FIGS. 4A and 4B are block diagrams illustrating features of exemplary edge/motion processing components consistent with aspects related to the innovations herein.

FIG. 4A illustrates a block diagram of an exemplary system including an exemplary edge/motion processing/blending 150 unit for determining pixel information. As illustrated, edge/motion processing/blending component 150 further comprises edge/motion processing unit 151 coupled to blending component 153, as shown. In this exemplary arrangement, edge/motion processing unit 151 receives edge data 136 from an edge adaptive interpolation process, wherein edge data 136 includes a first intensity estimate 139 for pixel X. Here, an edge adaptive interpolation process may be performed by edge adaptive interpolation unit 134, wherein edge data 136 may further comprise data pertaining to pixels A and C, which neighbor pixel X in a present field (i.e., A data 137 and C data 138). Edge/Motion processing unit 151 also receives motion data 142 from a motion compensation process, which includes an estimated motion vector for at least one pixel proximate to pixel X in at least one reference field. In the illustrated example, the motion compensation process may be performed by motion estimator/compensator unit 140, wherein motion data 142 may include a motion vector for a pixel D (e.g., motion vector 143, wherein data pertaining to pixel D is data from a reference field occurring prior to the present field) and/or a motion vector for a pixel E (e.g., motion vector 144, wherein data pertaining to pixel E is data from a reference field occurring subsequent to the present field). Edge/Motion processing unit 151 may then determine a second intensity estimate 154 for pixel X as a function of edge data 136 from the edge adaptive interpolation process and motion data 142 from the motion compensation process. Second intensity estimate 154 may then be input to a processing/combining component, such as blending component 153 where an intensity-calculation procedure may be performed, for example, where an interpolated intensity (i.e., edge/motion data 152) of pixel X is calculated as a function of first intensity estimate 139 and second intensity estimate 154.

In some aspects related to the innovations herein, motion data 142 may further comprise motion reliability data 145 which may be input to blending component 153, as shown. According to such aspects, motion reliability data 145 may reflect the reliability of the estimated motion vector(s) calculated by the motion compensation process (e.g., values reflecting the respective reliabilities of motion vector 143 and motion vector 144). Moreover, for such aspects, the intensity-calculation procedure performed by blending component 153 may further comprise selectively weighting the interpolated intensity of the pixel according to motion reliability data 145. In other embodiments, blending component 153 may include logic (implemented by hardware, software, firmware, combinations thereof, etc.) that implements interpolating intensity of the pixel to equal to the first intensity estimate 139 if motion reliability data 145 is below a threshold.

Figure 4B:
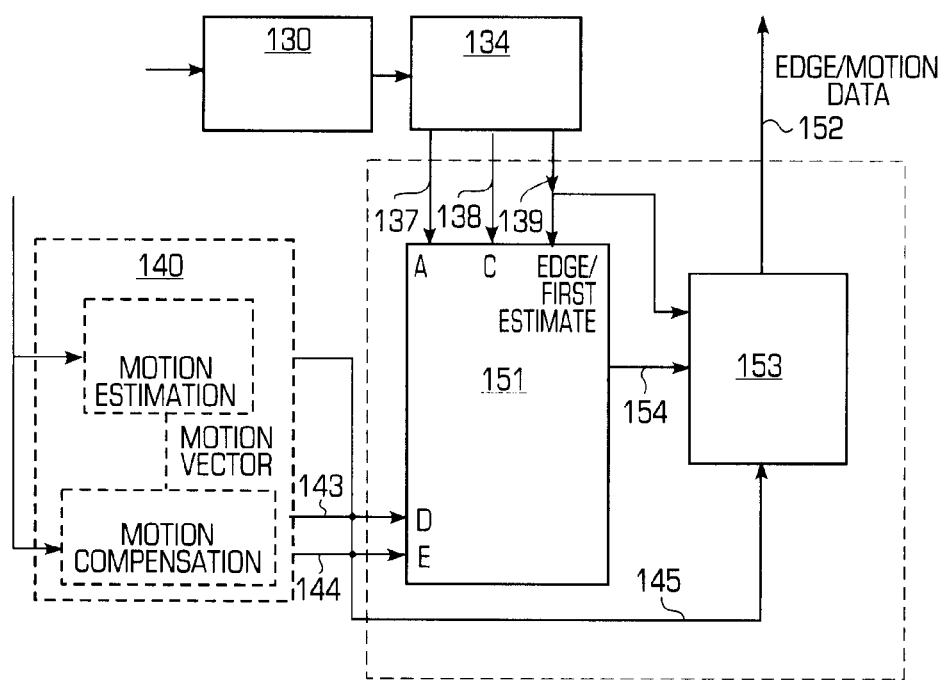

FIG. 4B is a block diagrams illustrating another implementation of exemplary edge/motion processing components consistent with aspects related to the innovations herein. The exemplary system of FIG. 4B illustrates further connectivity and specific functionality of edge/motion processing components of the innovations herein. For example, blending block 153 may be configured such that its output, edge/motion data output 152, equals the following:

$$(edge/1st\ estimate)*(Max-reliability[145])+(2nd\ estimate[154])*(reliability)/Max$$

Where Max may be the associated Maximum (e.g., 16 for 4-bit values)

The exemplary system of FIG. 4B may also perform edge/motion processing consistent with the components shown in FIG. 4A. Further, the first estimate 139 value may be a simple edge adaptive interpolation result provided by the edge adaptive interpolation unit.

Figure 5A:
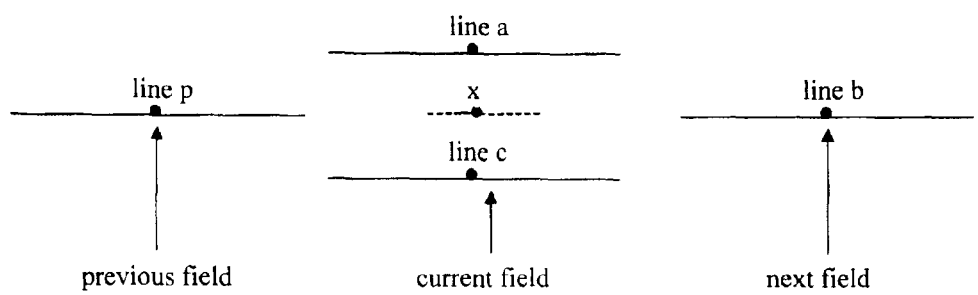
FIGS. 5A and 5B are diagrams illustrating field-to-field features of exemplary pixel processing functionality consistent with aspects related to the innovations herein.
Figure 5B:
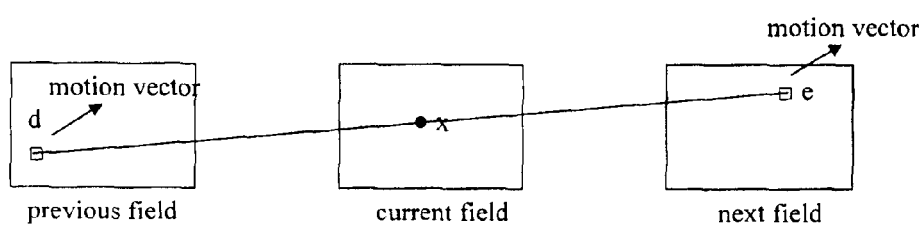

FIGS. 5a and 5b are illustrations of motion vector and pixel information consistent with the edge/motion processing/blending component 150 and other processing/blending components 151, 153, 160 of FIGS. 3 and 4, according to one or more aspects of the innovations herein. In the exemplary systems of FIGS. 3 and 4, "A" may represent the pixel in line a along the detected edge direction, "C" may represent the pixel in line c along the detected edge direction, "first estimate" may represent an estimate such as the edge adaptive interpolation result, which may be equal to (a+c)/2, "D" may represent x's projected pixel along the motion vector direction in the previous field, and "E" may represent x's projected pixel along the motion vector direction in the next field. As such, for large boundaries where edge detection is reliable, A and C are almost the same, and the calculated edge value is preserved and output for subsequent processing. For detail area motion, where edge direction detection is unreliable, the D and E values are more reliable. As such, based upon the relative strengths of the input data, either d or e are used to increase the detail motion area's clarity. (FIG. 5B illustrates the correlation between the d and e data of FIGS. 3 and 4 and motion vectors in connection with current pixel/line x.) Thus, for example, a motion estimating component yields the motion vector for each pixel, which provides the motion direction of each pixel. The motion vector may then be used to predict pixels' position(s) in the previous and/or next field. Thus, using this motion vector information, the missing line x may be predicted from the previous field or the next field.

In this exemplary regime illustrated in FIG. 5A, x is the line to be generated for deinterlacing. If the motion detector output is static, then x=f(p,b), or the result for static area processing. If the motion detector output is motion, then x=f(a,c), where f(a,c) is edge adaptive interpolation. However, for motion area, x=f(a,c), vertical resolution is half of static area processing. Accordingly, without further processing, the output of the deinterlacer may show an incorrect video image, such as a blurred image, due to such use of only intra-field information.

The innovations herein may include edge adaptive processing consistent with the above. For example, with regard to interpolation at the pixel, processing can further include, if the edge direction is substantially vertical, forming an intermediate pixel value by averaging at least one pixel substantially directly above and at least one pixel substantially directly below the pixel, if the edge direction is approximately 45 degrees from vertical, then forming the intermediate pixel value by averaging at least one pixel above and at least one pixel below the pixel and substantially along a 45 degree axis through the pixel, and if the edge direction is approximately 135 degrees from vertical, then forming the intermediate pixel value by averaging at least one pixel above and at least one pixel below the pixel and substantially along a 135 degree axis through the pixel. Further, motion adaptive interpolation at the pixel can be performed by multiplying the intermediate pixel value by the motion value and adding the value of the pixel from the next field multiplied by the difference between a maximum motion value and the motion value to form a final interpolated value for the pixel.

Other exemplary aspects relate to interpolating a pixel during deinterlacing of a video signal, wherein the video signal includes at least two fields of interlaced scan lines, each scan line including a series of pixels having respective intensity values. Here, for example, a motion value generating component may generate a motion value representative of the motion between successive frames about the pixel, an edge direction detector may detect an edge direction about the pixel, an edge adaptive interpolator may perform an edge adaptive interpolation at the pixel using the detected edge direction, and a motion adaptive interpolator may perform a motion adaptive interpolation at the pixel, using the generated motion value.

Further aspects may include one or more of the following exemplary features. A motion value generating component can compare segments of pixels from successive frames about the pixel to generate the motion value. The segments can include at least two consecutive pixels in a scan line. The motion value generating component can further include a difference calculator configured to calculate a plurality of differences for each of a plurality of pixel segments from successive frames about the pixel, a difference comparator configured to determine the greatest of the calculated plurality of differences, and a look-up table of motion value configured to be indexed by the greatest of the calculated plurality of differences from the difference comparator. The motion value generating component can further include an edge detector configured to detect whether an edge exists about the pixel, where the look-up table is selected from a plurality of look-up tables depending upon whether an exists. The motion value can be generated by comparing segments of pixels about the pixel from at least three successive frames. A feature buffer may also be used to store the pixel segments for at least one of the successive frames.

Advantages of aspects of the innovations herein may include one or more of the following. By smoothly combining both intra-field and inter-field values for each pixel in a frame, weighted by the detected motion at the pixel, greater accuracy in deinterlacing scanned video signals and greater fidelity in the displayed image can be provided, for both static and dynamic portions of scene. Use of inter-field interpolation techniques for pixels having lower motion values allows for higher vertical resolution. Use of intra-field interpolation for pixels with higher motion values reduces unwanted motion effects. Combining both in a linear function, weighted by the detected motion at the pixel, can smoothly provide the best of both techniques. By selecting a motion value look-up table based upon whether an edge is detected at the pixel allows for more accurate motion value determinations. Determining motion values based upon the pixel processing set forth herein (e.g., segmentation, etc.) can increase motion detection accuracy and reduce noise and false motion determinations. Further, since each pixel in a segment will share a common motion value, segmentation sharply reduces the number of motion calculations required per frame. Use of at least three frames of segmented pixel information allows for more accurate motion determinations. Use of segmentation and feature buffers for storing segments of prior frames can reduce the bandwidth required to perform feature buffer reads and writes. It can also eliminate the need to perform segmentation calculations more than once per frame. Interpolating a pixel value along a detected edge provides further accuracy in deinterlacing a video signal.

Figure 6:
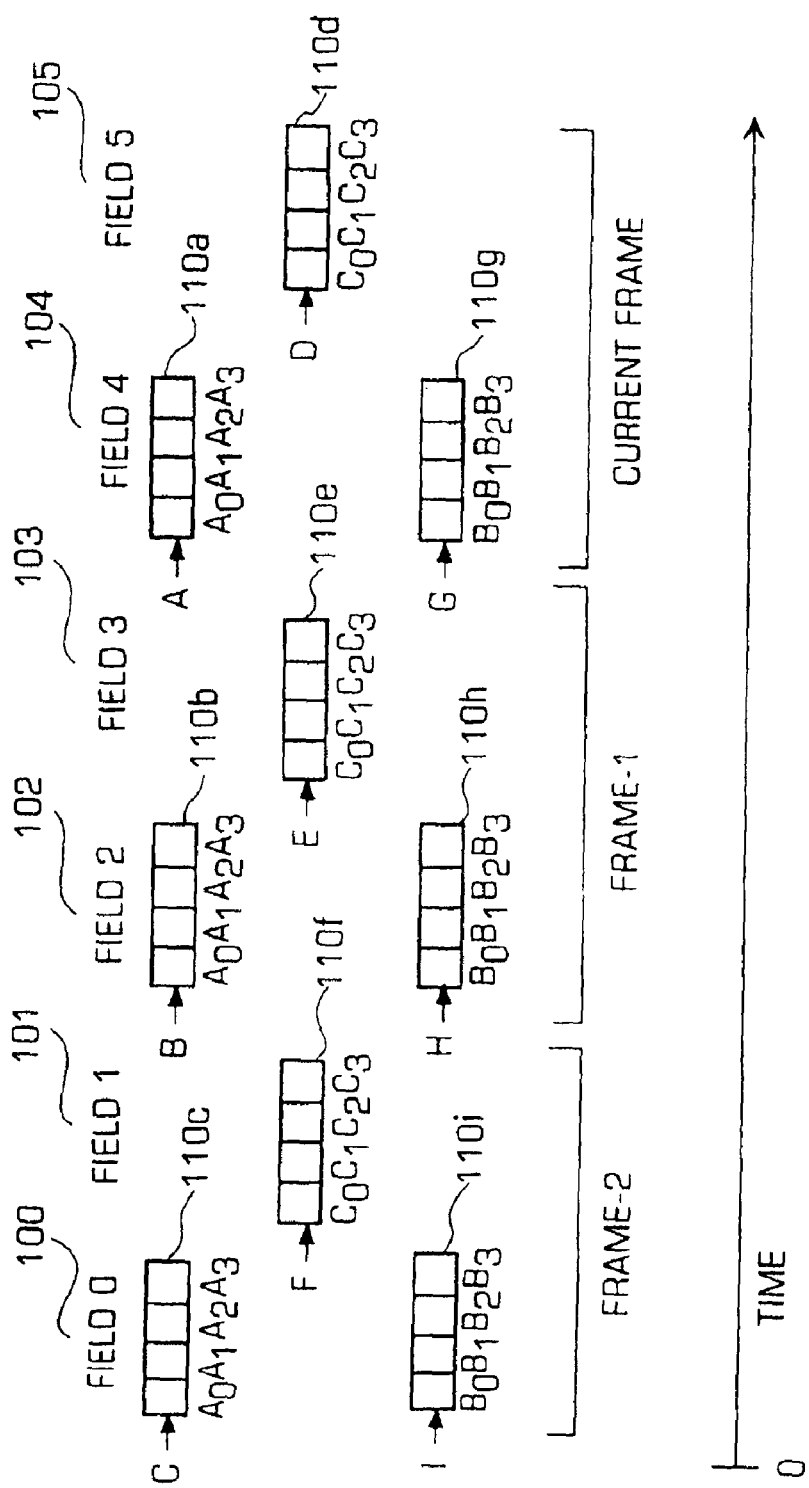
FIG. 6 is a time diagram illustrating an exemplary inter-field pixel segments used in a motion detection method consistent with aspects related to the innovations herein.
Figure 7:
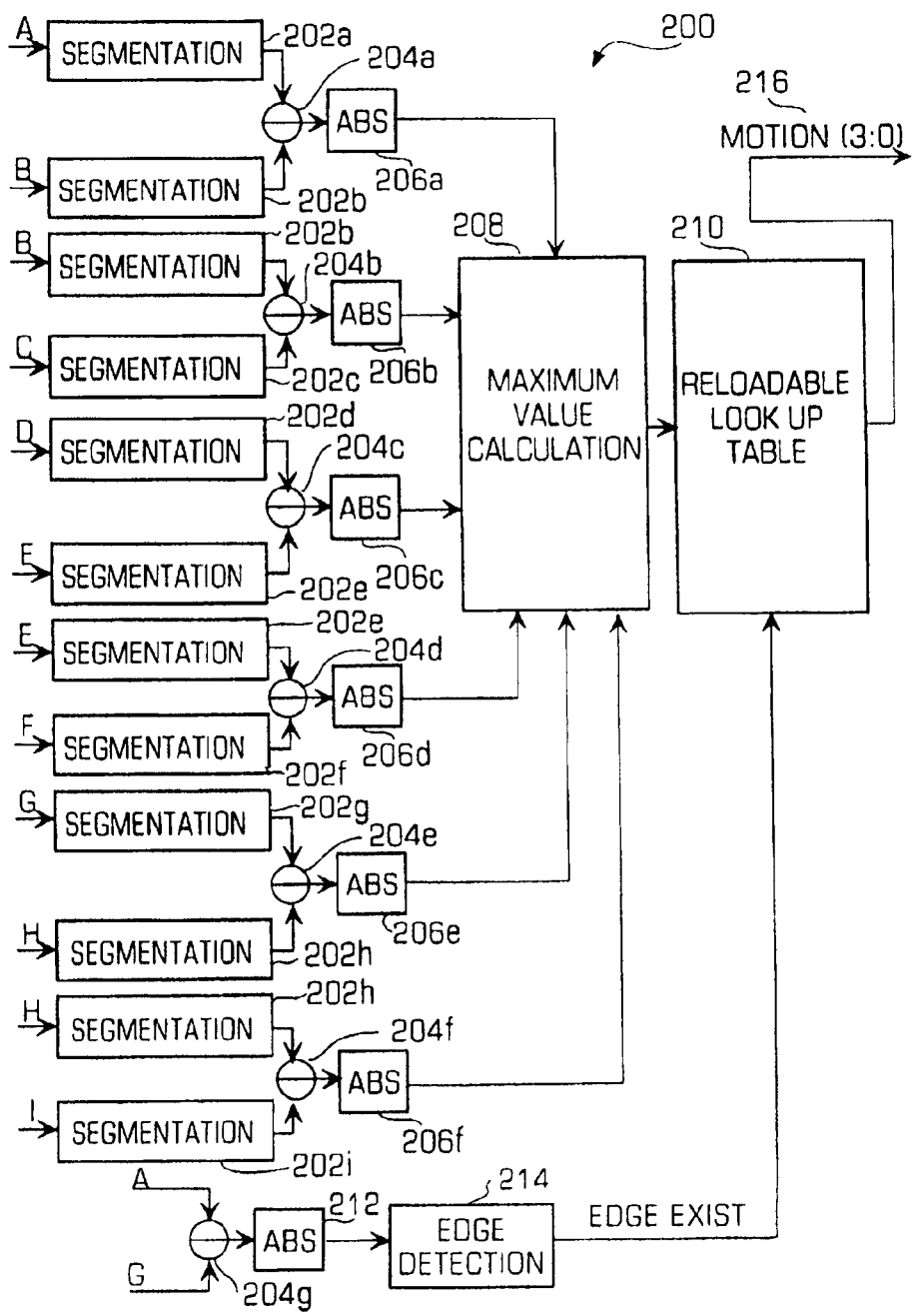
FIG. 7 is a schematic diagram illustrating an exemplary system for processing motion value information consistent with aspects related to the innovations herein.

Further initial motion detection processing is described next. Referring to FIGS. 6 and 7, the motion value for a pixel X may be generated by analyzing groups of pixels around pixel X for a succession of fields. According to some aspects, six fields are consulted: field 0 (item 100) and field 1 (item 101) are two frames prior to the current frame, field 2 (item 102) and field 3 (item 103) are one frame prior to the current frame, and field 4 (104) and field 5 (105) comprise the current frame. In addition, segments of pixels (110a through 110i) from these fields, rather than individual pixels, are compared to detect the motion value. In one embodiment, each segment 110a-i comprises four contiguous pixels in a scanning line, averaged into one intensity value. Any number of pixels greater than one can be segmented in this manner.

Each segment used in the motion value calculation for pixel X is generally either adjacent to or contains pixel X. For example, segment A (110*a*) from field 4 of the current frame is a segment of pixels above pixel X, while segment G (110*g*) from the same field is a segment of pixels below pixel X. And segment D (110*d*) is from the next field 5 of the same frame, and contains pixel X.

Segmenting pixels together for performing motion detection has several advantages. First, it reduces noise and increases motion detection accuracy. Second, each of the pixels (e.g., four) within a segment will share the same motion value, so that motion calculations need be done only, e.g., once every four pixels. And third, as described further below, since motion calculations require comparing several frames of segment information, segmentation allows storage of prior field information in a more compact form, e.g., in feature buffers.

Referring to FIG. 7, the motion value detection method 200 is shown schematically. The motion value detection method can be implemented in any convenient manner, e.g., in software on a general purpose computer, or in dedicated hardware. In a preferred embodiment, after segmenting each required block of pixels (logical blocks 202*a* through 202*i*) the differences between respective pairs of segments of pixels adjacent (or containing) pixel X from successive fields are determined. For example, segment A (110*a*) from current even field 4 is subtracted (block 204*a*) from segment B (110*b*) of prior even field 2, and the absolute value of the result (block 206*a*) is determined. Similarly, the absolute value (block 206*b*) of the difference (block 204*b*) of segment B (110*b*) of prior even field 2 and segment C (110*c*) of earlier even field 0 is determined. In likewise fashion, segment E (110*e*) is subtracted from segment D (110*d*), segment F (110*f*) is subtracted from segment E (110*e*), segment H (110*h*) is subtracted from segment G (110*g*), and segment I (110*i*) is subtracted from segment H (110*h*) (blocks 202*c* through 202*f*). The absolute value of each of these differences is determined next (blocks 206*c* through 206*f*). Then the maximum of these absolute difference values is determined (block 208). The resulting maximum difference value (Max Intersegment Difference) is then used as an index to a reloadable look-up table of motion values (block 210) to output a final motion value 216. In one embodiment, each pixel (and each averaged pixel segment) has 8 bit intensity values (that is, from 0 to 255) and the motion value 216 is a 4 bit number having values from 0 to 15.

In one embodiment, a different look-up table can be loaded depending upon whether an edge is detected around pixel X or not. For example, the difference between segments A (110*a*) and G (110*g*) of the current even field 4 can be determined (block 204*g*), and the absolute value of the result compared against an edge threshold value in an edge detection step (block 214) to determine if there is a sharp difference from above and below pixel X. This determines whether there is an intra-field vertical edge at pixel X.

If no edge is detected, the look-up table can be a simple function: Motion[3:0]=Max Intersegment Difference, if less than or equal to 15; and Motion[3:0]=15 for all other values of Max Intersegment Difference.

If an edge (e.g., an intra-field vertical edge) is detected, the effective motion value can be reduced, for example: Motion[3:0]=½ Max Intersegment Difference, if less than or equal to 31; and Motion[3:0]=15 for all other values of Max Intersegment Difference.

Using a different look-up table (having reduced motion values) when an edge is detected can generate a more accurate interpolation result. As made clearer with respect to the interpolation calculations described below, if an edge is detected, and a reduced motion value is retrieved from the alternative look-up table, the deinterlacing calculation will generate the intensity of pixel X by taking more of its value from the next field and using less interpolation from the existing pixels surrounding pixel X in its current field, which might otherwise "soften" the edge and produce, in general, a less accurate result.

A variety of look-up tables for motion values can be used depending upon implementation. For example, the motion value can be a full 8 bit number, fully mapping to the scale of maximum intensity differences generated between successive pixel segments. Also, more elaborate edge detection algorithms (as described further below) can be used to select from different look-up tables depending upon edge direction.

Figure 8A:
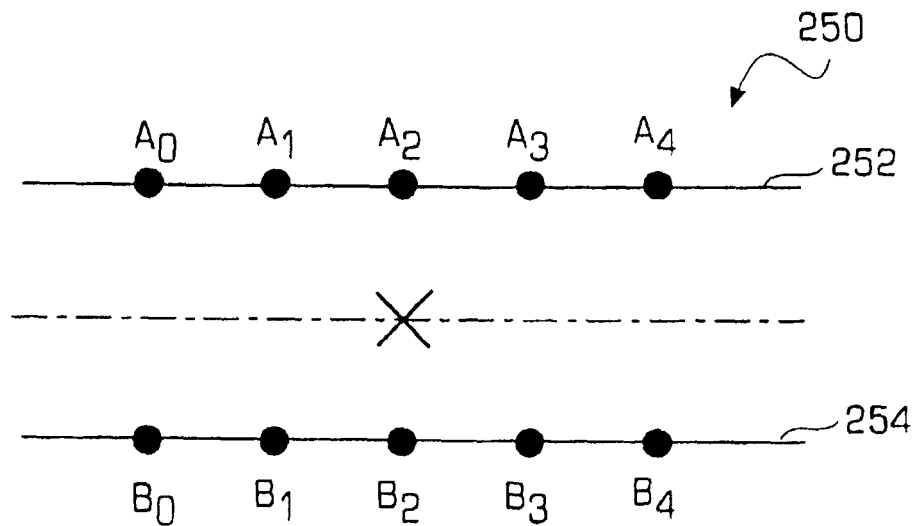
FIGS. 8A-8D are exemplary pixel diagrams illustrating edge detection features consistent with aspects related to the innovations herein.
Figure 8B:
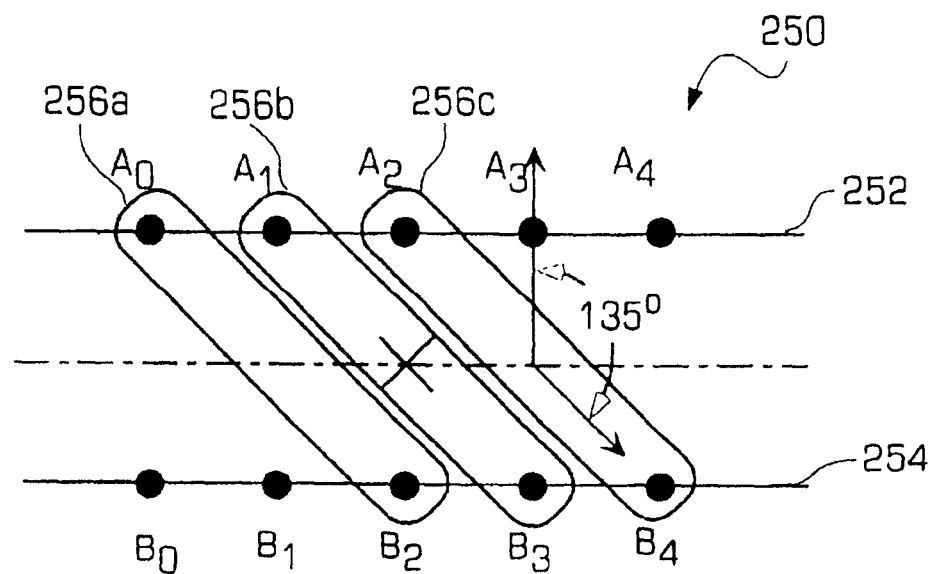
Figure 8C:
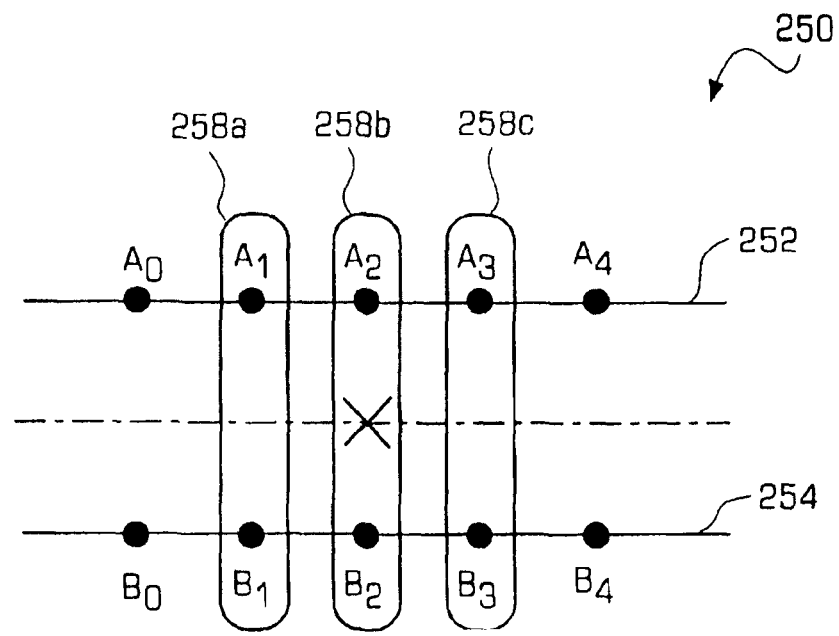

After the motion value is generated (e.g., step 22 of FIG. 2), the direction of an edge adjacent pixel X (if any) may be determined (e.g., step 24 of FIG. 2). Referring to FIGS. 8*a* through 8*d*, edge detection is performed on groups of pixels 250 above and below pixel X. As shown in FIG. 8*a*, scan line 252 above pixel X includes five pixels $A_0$ through $A_5$ and scan line 254 below pixel X includes five pixels $B_0$ through $B_5$. Referring to FIG. 7*b*, the edge detection algorithm first computes the respective differences between three pairs of pixels about pixel X (256*a*, 256*b*, and 256*c*), along a 135 degree axis (as measured from vertical), each pair comprising one pixel from scan line 252 and one from scan line 254. The absolute values of these respective differences are then summed to yield a Diff135 value:

Similarly, referring to FIG. 8*c*, the edge detection algorithm next computes the respective differences between three pairs of pixels about pixel X (258*a*, 258*b*, and 258*c*), along a 90 degree (or vertical) axis. The absolute values of these respective differences are then summed to yield a Diff90 value:

where Factor is a sensitivity constant that reduces the sensitivity of the Diff90 calculation. In one embodiment, Factor=0.75.

Figure 8D:
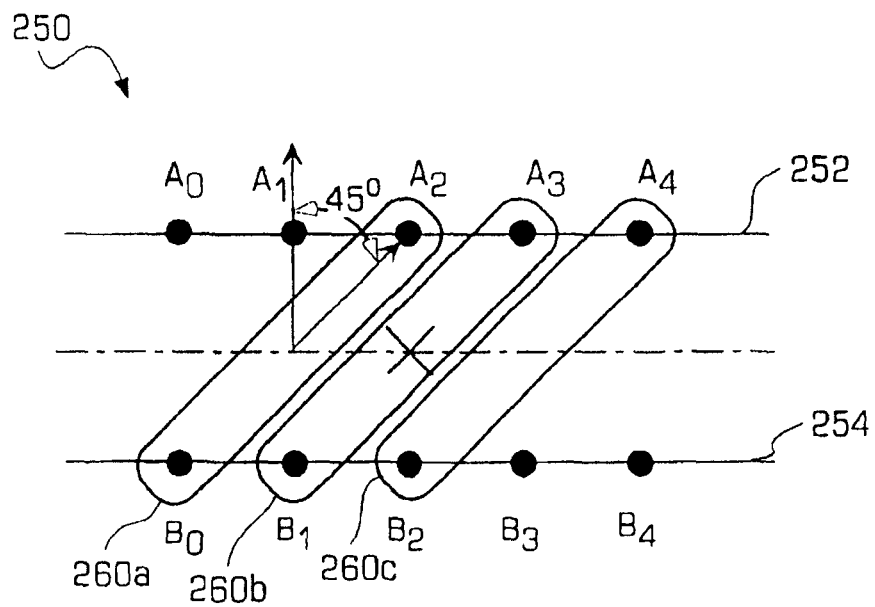

And, referring to FIG. 8*d*, the edge detection algorithm next computes the respective differences between three pairs of pixels about pixel X (260*a*, 260*b*, and 260*c*), along a 45 degree axis. The absolute values of these respective differences are then summed to yield a Diff45 value:

These three comparisons of pixel pairs along three different directions about pixel X (the pixel to be interpolated) are then compared to determine the existence and direction of an edge about pixel X.

First, Diff45 and Diff135 are compared against an edge threshold to determine if a substantially non-vertical edge exists:

IF .vertline.Diff45−Diff135.vertline.>Edge_Threshold
    THEN Edge_Exist where Edge_Threshold is another sensitivity factor for deciding edge existence.

In one embodiment, Edge_Threshold=32. Both Edge Threshold and Factor can be adjusted to account for scenes with a higher level of detail that might generate false edge indications. In particular, edge calculations should generally not determine that small details such as thin lines are edges. The sensitivity constant Factor can account for instances where, e.g., a single thin line would generate a high 90 degree difference across pixel sets, but low 45 degree and 135 differences, thereby possibly generating a false edge.

The default condition for the edge detection algorithm is no edge (or a 90 degree edge). The edge detection algorithm uses the Diff45, Diff90, and Diff135 results to determine the direction of an existing edge: IF ((Diff45<=Diff90) AND (Diff45<=Diff135) AND Edge_Exist) THEN Edge[1:0]=10; ELSE IF ((Diff135<=Diff90) AND (Diff135<=Diff45) AND Edge_Exist) THEN Edge[1:0]=11; ELSE Edge[1:0]=00.

where Edge[1:0] is a two bit binary code for edge conditions: Edge[1:0]=00 in binary indicates no (or a vertical) edge, Edge[1:0]=10 indicates an edge substantially along the 45 degree axis; and Edge[1:0]=11 indicates an edge substantially along the 135 degree axis. Any other convention for defining Edge can be used as well.

Figure 9:
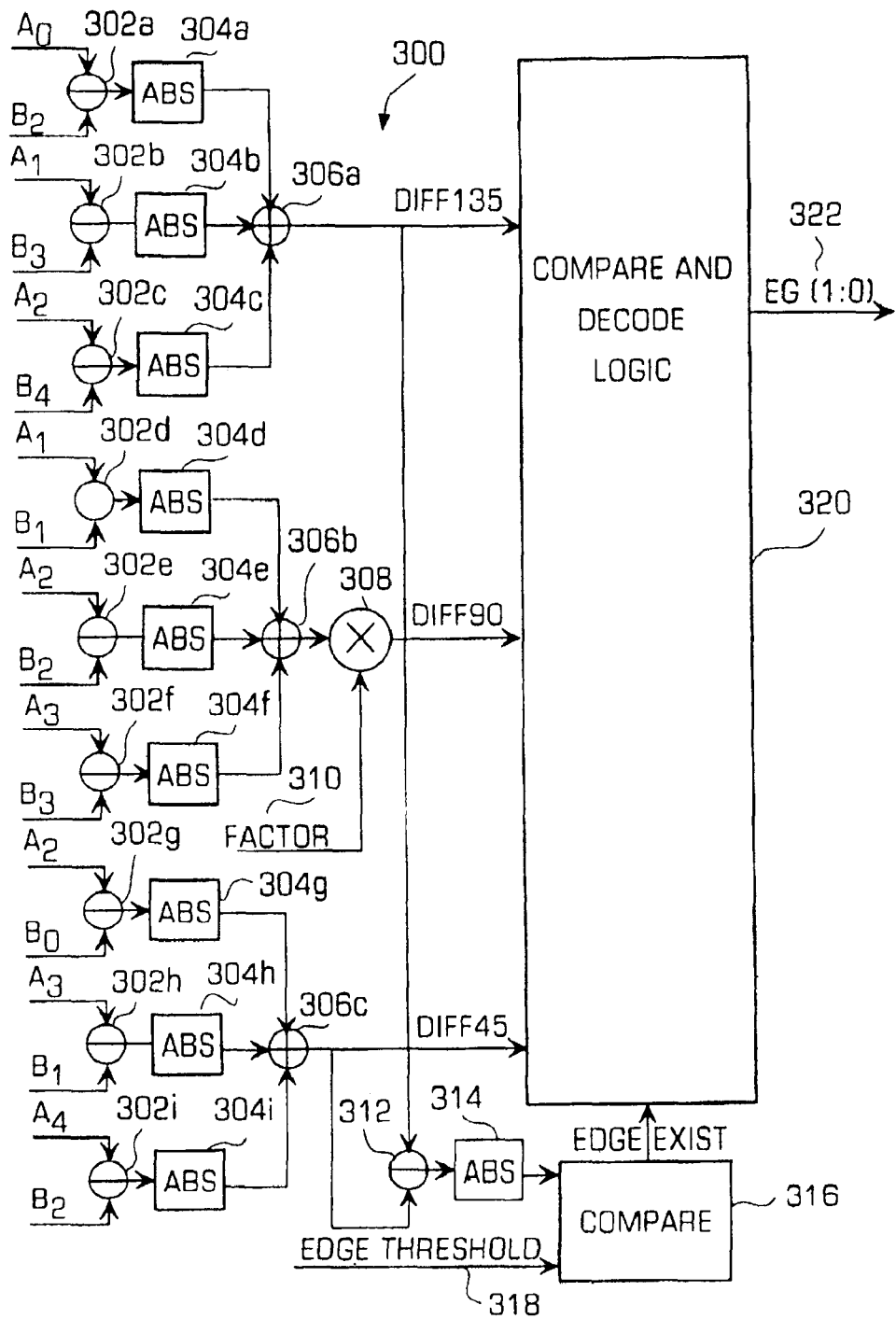
FIG. 9 is a schematic diagram illustrating an exemplary system for processing edge information consistent with aspects related to the innovations herein.

FIG. 9 represents a schematic diagram 300 for implementing the edge detection algorithm. Diff135 is calculated first by calculating the respective differences of three pixel pairs ($A_0-B_2$, $A_1-B_3$, $A_2-B_4$) (in logical blocks 302a through 302c), taking the absolute value of those differences (blocks 304a through 304c), and then summing the results (block 306a). Diff90 is calculated by calculating the respective differences of three other pixel pairs ($A_1-B_1$, $A_2-B_2$, $A_3-B_3$) (in blocks 302d through 302f), taking the absolute value of those differences (blocks 304d through 304f), summing the results (block 306b), and then multiplying by Factor 310 (block 308). And Diff45 is calculated first by calculating the respective differences of three other pixel pairs ($A_2-B_0$, $A_3-B_1$, $A_4-B_2$) (in blocks 302g through 302i), taking the absolute value of those differences (blocks 304g through 304i), and then summing the results (block 306c).

The difference between Diff135 and Diff45 is then determined (block 312), and the absolute value of the result (block 314) is compared with an edge threshold 318 to determine whether Edge Exist is TRUE (block 316). Then Diff90, Diff135, Diff45, and the Edge_Exist signal are provided to compare and decode logic 320 which performs the comparisons described above to produce a final Edge[1:0] signal 322.

After Edge[1:0] and Motion[3:0] have been determined (which can be accomplished in any order or in parallel), an intermediate intra-field interpolation result M_Data for pixel X is calculated (step 26 of FIG. 2) as follows: IF Edge[1:0]=00 (a 90 degree or no edge), THEN M_Data=$A_2/2$+$B_2/2$; IF Edge[1:0]=10 (a 45 degree edge), THEN M_Data=$A_3/2$+$B_1/2$; and IF Edge[1:0]=11 (a 135 degree edge), THEN M_Data=$A_1/2$+$B_3/2$;

These calculations interpolate the value for pixel X based upon the values along the detected edge, providing for more accurate edge depiction.

Finally, the intra-field interpolation result is mixed with the value $C_2$ for pixel X obtained from the next field (e.g., odd field 12 in FIG. 1): IF (Motion=15) THEN X=M_Data; Else X=((16-Motion[3:0]).multidot.C+(Motion.multidot.M_ Data))/16.

Since Motion is a 0 to 15 valued integer, if Motion is high, most of pixel X is determined by the intra-field result M_Data. If Motion is very low, all of the value of pixel X is determined from its value C in the next field.

By smoothly combining both intra-field and inter-field values for each pixel in a frame, weighted by the detected motion at the pixel, the present methods provide for greater accuracy in deinterlacing scanned video signals and greater fidelity in the displayed image, for both static and dynamic portions of scene.

As set forth above, outputs from edge/motion processing/blending component 150 (See, e.g., FIGS. 3 and 4) may be communicated to a post-processing component, such as blending component 160. Using the above edge adaptive interpolation, any edge direction detection error may possibly generate an inaccurate output. If such result directly goes to the display, there may exist annoying dot noise when the edge direction is not correct. The edge detection algorithm can not always guarantee 100% accuracy, especially for pictures with great detail. To remove such artifacts related with inaccurate edge direction, the present invention includes one or more post-processing components, such as blending components, which may be used or performed after initial edge/motion processing to remove such noise.

Figure 10:
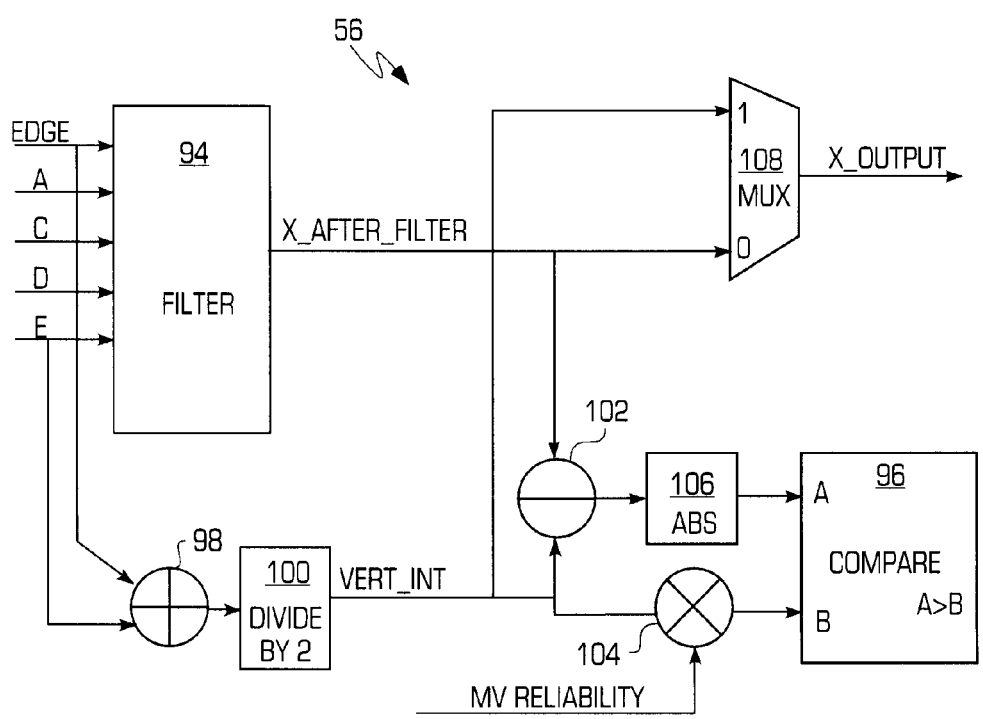
FIG. 10 illustrates exemplary post-processing edge interpolation and motion estimation features consistent with aspects related to the innovations herein.

FIG. 10 illustrates one exemplary implementation, a post processing block 56, of a post-processing component 150, such as edge/motion processing unit 151 and associated components. As shown, this exemplary post-processing component includes a filter 94, such as a five points median filter, a comparator 96, a summing block 98, a division block 100, a subtraction block 102, a multiplication block 104, an absolute value block 106 and a multiplexer 108. In these exemplary discussions and illustration, the five points used for the filter 94 are simply pixel luminance and edge adaptive data, however post processing/blending consistent with the innovations herein may be performed on other ranges of outputs and/or data herein. While basic edge processing functionality is described below in connection with FIG. 10, extended interpolation and motion processing features of the innovations herein may be consistent with the following example. By way of example, since X may be interpolated, for example, by the pixels above and below, there should be no vertical high frequency component along A, EDGE and C, where EDGE is the edge adaptive interpolation result. On this basis, if EDGE is larger than both A and C or EDGE is smaller than both A and C, the system will consider EDGE to be incorrect or dot noise created by inaccurate edge direction. As such, a component such as a median filter may be used to advantageously filter out/through such erroneous data and/or remove noise. In some implementations, the system may use a filter 94 such as a five points median filter to remove impulsive noise, such as dot noise.

The data or output signal EDGE from the initial edge/motion processing is first communicated to a filter 94, along with signals A, C, D and E.

$$X\_after\_filter=median5(A,C,EDGE,D,E);$$

Where

Function median5(a,b,c,d,e) is effective to select the middle value of a, b, c, d, e A and C may be edge data such as edge adaptive interpolations D and E may be motion information such as motion compensation data After the filter 94, the result (i.e., signal X_after_filter) may be compared with multiplexed 98 inputs to see if any difference are too great. If the values are too far apart, the system may conclude that the result is not reliable may replace the output with an average. The replacement functionality may be performed by multiplexer 108. As shown in the example of FIG. 10, an exemplary process may include the following calculations, which are performed by blocks 98-108:

$$Vert\ int=(A+C)/2;$$

$$If\ (abs(X\_after\_filter\ Vert\_int)>(Vert\ int*factor))$$

$$Then\ X\ output=(A+C)/2;$$

Else $$X\_output=X\_after\_filter.$$

Blocks 98 and 100 are effective to provide the Vert_int signal. Blocks 102 and 106 cooperate to provide input A to comparator 96, which is equal to the absolute value of (X_after_filter−Vert int). Block 104 is effective to multiply Vert int by an appropriate factor [2:0] to provide input B to comparator 96. The value of the factor may be selected in an appropriate manner by an operator of a system based on a desired accuracy, the parameters of the system, and/or trial an error. Comparator 96 is effective to compare A and B, and signal multiplexer 108 selects as X_output, X_after_filter if the result is reliable (i.e., A is not greater than B), or (A+B)/2 if the result is not reliable (i.e., A is greater than B). Output signal X_output may then be provided as output or to subsequent filtering, processing and/or blending components/processes, i.e., for display as part of the interpolated image.

The sensitivity and reliability of the post-processing can be controlled by varying the product of the Vert int signal and the factor[2:0] (i.e., by altering the value of the factor). Post-processing block 56 can thus provide as an output either the edge adaptive interpolated value for interpolated pixel, or a vertical interpolation value, which is the average of the pixels immediately above and immediately below the interpolated pixel 12. The factor[2:0] serves to adjust the sensitivity of the edge interpolation such that the more reliable of the two values is output from post-processing block 56.

Figure 11:
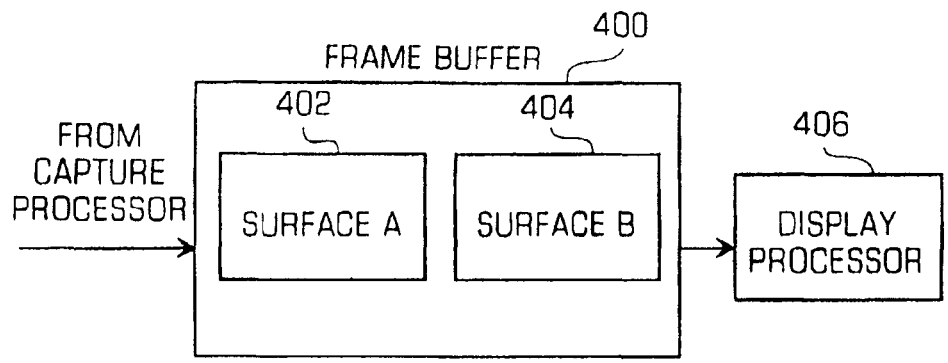
FIG. 11 illustrates a prior art frame buffer for frame displays.

In addition to the logical hardware shown in FIGS. 6 and 8, it can be useful to provide for memory storage of prior frame information for performing motion calculations. As shown in FIG. 11, for a number of video applications (for example, in typical PC graphics processors and video cards) a frame buffer 400 comprises two buffers (here termed Surface A 402 and Surface B 404) that hold sequential video frames. One buffer is written to by a capture processor or the like, while the other buffer is read out to the display processor 406 for display upon the video screen. This ensures that the memory being read out is not tampered with by memory writes for the next frame. Double buffers are especially useful in implementations where the input vertical synchronization is different from the output vertical synch signal. In typical double buffering, though, the display processor has no access to the prior frame of information.

Figure 12:
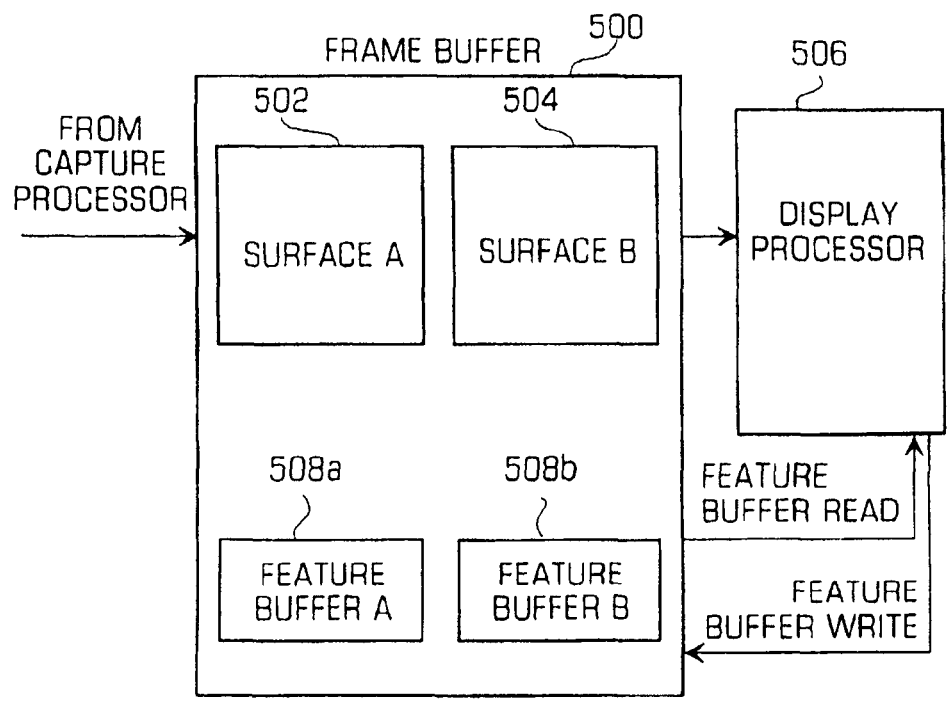
FIG. 12 illustrates a frame buffer including feature buffers for real-time motion and edge-adaptive deinterlacing consistent with aspects related to the innovations herein.

As shown in FIG. 12, to enable motion detection for several prior frames of pixel information, one embodiment of the present invention employs two feature buffers, feature buffer A 508*a* and feature buffer B 508*b*. For each frame that is displayed, display processor 506 extracts pertinent features of the current frame and writes it back to frame buffer 500, storing it in one of the feature buffers 508*a* or 508*b*. In this manner, the two feature buffers will store two prior frame's worth of pertinent feature information that can be used by the motion detector during motion calculations to generate motion values for each pixel of a current frame.

As described above, during motion detection the present invention uses segmentation to average four contiguous pixels into one averaged pixel segment. These segments are then compared, as described above. One convenient result of segmentation is that only the calculated pixel segments for a current frame need be stored in the feature buffers 508*a* and 508*b*. This reduces the bandwidth required to perform feature buffer reads and writes. It also eliminates the need to perform segmentation calculations more than once per frame. As described above, determining motion values based upon segments of pixels also can increase motion detection accuracy and reduce noise and false motion determinations. Further, since each pixel in a segment will share a common motion value, segmentation sharply reduces the number of motion calculations required per frame. As noted above, each segment can have any number of pixels: four was selected here for one embodiment of the invention.

Other embodiments are within the scope of the claims. For example, any of the logical blocks can be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) to be read by a central processing unit to implement the functions of the present invention. Or, the modules can comprise programming instructions transmitted to a general purpose computer or to graphics processing hardware via a transmission carrier wave. Also, the modules can be implemented as hardware logic circuitry implementing the functions encompassed by the present invention. Any number of pixels can be combined into segments used for the motion detection calculations. Any number of prior frames can be used to detect motion at a pixel location. Any number of pixel pairs can be used for edge detection. Other edge directions can be determined by using different selections of pixel pairs. Different groups of pixels can be selected to determine edge directions and/or interpolate values. Different motion factors and edge thresholds can be selected to adjust the sensitivity of the calculations. The deinterlacing methods and apparatus can be used for both digital and analog video signals, in particular for noninterlaced television applications.

As disclosed herein, embodiments and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe source code editing components such as software, systems and methods consistent with the present invention may be implemented with any combination of hardware, software and/or firmware. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

The invention claimed is:

1. A method of processing pixel information associated with video image deinterlacing, the method comprising:
   performing an edge adaptive interpolation process on a present field so as to determine whether an edge passes through a pixel, wherein the edge adaptive interpolation process outputs edge data, including a first intensity estimate for the pixel;
   processing motion data associated with motion compensation processing, wherein the motion data includes a first estimated motion vector for a pixel in a reference field prior to the present field and a second estimated motion vector for a pixel in a reference field subsequent to the present field;
   determining a second intensity estimate for the pixel as a function of the edge data and the motion data; and
   performing a blending process wherein final edge/motion data of the pixel, including an interpolated intensity of the pixel, is calculated as a function of the first intensity estimate and the second intensity estimate.

2. The method of claim 1, wherein the second intensity estimate is obtained as a function of a median filter process of the edge data and the motion data.

3. The method of claim 2, wherein edge data used by the median filter process includes the first intensity estimate.

4. The method of claim 1, wherein the motion data includes the pixel's projected pixel along a motion vector direction in a previous field.

5. The method of claim 1, wherein the motion data includes the pixel's projected pixel along a motion vector direction in a next field.

6. The method of claim 1, wherein the motion data comprises estimated motion vector data.

7. The method of claim 1, wherein the motion compensation process further includes determining a value reflecting the reliability of said estimated motion vector, and wherein said intensity-calculation procedure further comprises weighting the interpolated intensity of the pixel according to said value.

8. The method of claim 7, wherein the interpolated intensity of the pixel is equal to the first intensity estimate if said value is below a threshold.

9. The method of claim 1, wherein the interpolated intensity of the pixel is a value representing the luminance of the pixel.

10. The method of claim 1, wherein the interpolated intensity of the pixel is a value representing the chrominance of the pixel.

11. A system that processes pixel information associated with a deinterlacing process, the apparatus comprising:
   an edge adaptive interpolation component, wherein the edge adaptive interpolation component determines whether an edge passes through a pixel in a present field, and wherein the edge adaptive interpolation component provides edge data, including a first intensity estimate for the pixel;
   a motion processing component that processes motion data associated with motion compensation processing, wherein the motion data includes a first estimated motion vector for a pixel in a reference field prior to the present field and a second estimated motion vector for a pixel in a reference field subsequent to the present field, and wherein the motion processing component determines a second intensity estimate for the pixel as a function of the edge data and the motion data; and
   a blending component that calculates final edge/motion data of the pixel, including an interpolated intensity of the pixel, as a function of the first intensity estimate, the second intensity estimate, and motion reliability data characterizing reliability of the motion data.

12. The system of claim 11, wherein said at least one reference field is a prior field relative to the present field.

13. The system of claim 11, wherein said at least one reference field is a subsequent field relative to the present field.

14. The system of claim 11, wherein said at least one reference field includes a first and second reference field, wherein said first reference field is a subsequent field relative to the present field, and wherein said second reference field is a prior field relative to the present field.

15. The system of claim 11, wherein the interpolated intensity of the pixel is a value representing the luminance of the pixel.

16. The system of claim 11, wherein the interpolated intensity of the pixel is a value representing the chrominance of the pixel.

17. The system of claim 11, wherein the motion processing component further determines a value reflecting the reliability of said estimated motion vector, and wherein said intensity-calculation component weights the interpolated intensity of the pixel according to said value.

18. The system of claim 17, wherein the interpolated intensity of the pixel is equal to the first intensity estimate if said value is below a threshold.

19. A method of processing pixel information based on received motion and edge data, the method comprising:
   processing edge data from edge-adaptive interpolation processing, including a first intensity estimate for the pixel as well as data pertaining to one or more pixels that neighbor the pixel;
   processing motion data associated with motion compensation processing, wherein the motion data includes a first estimated motion vector for a pixel in a reference field prior to the present field and a second estimated motion vector for a pixel in a reference field subsequent to the present field;
   determining a second intensity estimate for the pixel as a function of the edge data and the motion data; and
   performing a blending process wherein final edge/motion data of the pixel, including an interpolated intensity of the pixel, is calculated as a function of the first intensity estimate, the second intensity estimate, and motion reliability data characterizing reliability of the motion data.

20. The method of claim 19, wherein the motion compensation process further includes determining a value reflecting the reliability of said estimated motion vector, and wherein said intensity-calculation procedure further comprises weighting the interpolated intensity of the pixel according to said value.

21. The method of claim 20, wherein the interpolated intensity of the pixel is equal to the first intensity estimate if said value is below a threshold.

22. The method of claim 19, wherein the second intensity estimate is obtained as a function of a median filter process of the edge data and the motion data.

23. The method of claim 19 wherein the interpolated intensity of the pixel is a value representing the luminance of the pixel.

24. The method of claim 19 wherein the interpolated intensity of the pixel is a value representing the chrominance of the pixel.

25. A system for determining the intensity of a pixel in a present field during the deinterlacing of a video signal, the video signal further comprising a plurality of successive fields, the present field and each of said plurality of successive fields having interlaced scan lines, comprising:
- a first component for providing a first intensity estimate for the pixel, wherein said first intensity estimate is equal to the intensity of the pixel in the field immediately following the present field;
- a second component for providing a second intensity estimate for the pixel as a function of the edge data and the motion data, wherein the edge data includes data pertaining to one or more pixels that neighbor the pixel and the motion data includes a first estimated motion vector for a pixel in a reference field prior to the present field and a second estimated motion vector for a pixel in a reference field subsequent to the present field, wherein said second intensity estimate is equal to the output of an edge adaptive interpolation component, and wherein said edge adaptive interpolation component determines whether an edge passes through the pixel in the present field;
- a third component for providing a third intensity estimate for the pixel, wherein said third intensity estimate is calculated as a function of the second intensity estimate and a fourth intensity estimate obtained as a function of motion compensation data;
- a fourth component for assigning a motion value to the pixel, wherein said motion value is proportional to motion detected in a group of pixels proximate to the pixel; and
- a fifth component that calculates final edge/motion data of the pixel including determining the intensity of the pixel, wherein the determined intensity of the pixel is a function of the motion value, the first intensity estimate, and the third intensity estimate.

26. The system of claim 25, wherein a field prior to the present field and a field subsequent to the present field are utilized as reference fields.

27. The system of claim 25, wherein the third component determines the third intensity estimate for the pixel as a function of a value reflecting the reliability of the estimated motion vector.

28. The system of claim 27, wherein the third intensity estimate for the pixel is equal to the second intensity estimate if the value is below a threshold.

* * * * *